J. F. HUBER.
ACCOUNT FILE.
APPLICATION FILED MAY 7, 1910.
1,015,444.
Patented Jan. 23, 1912.
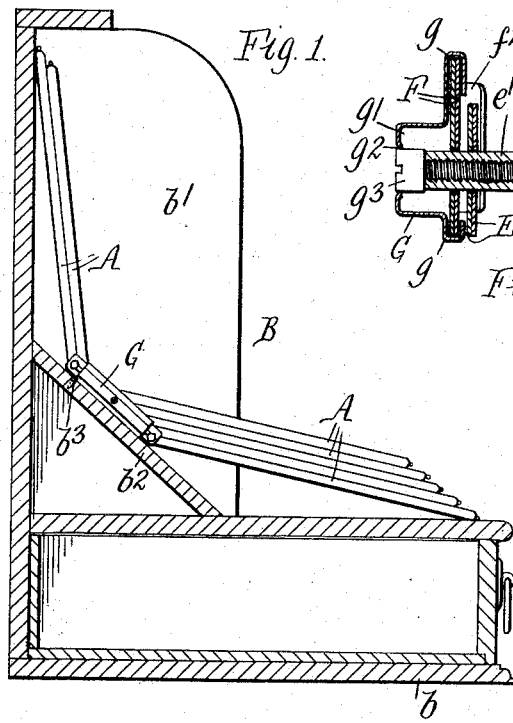
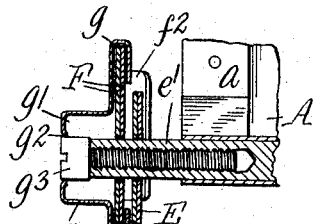
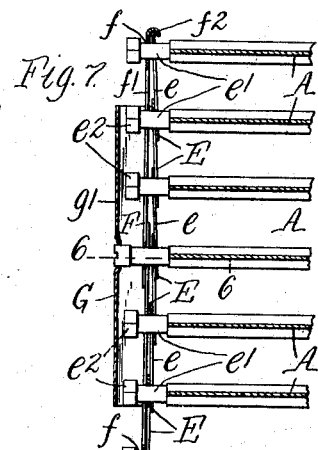
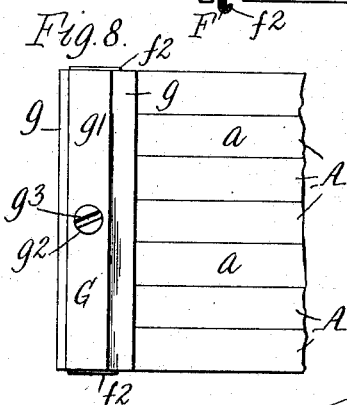
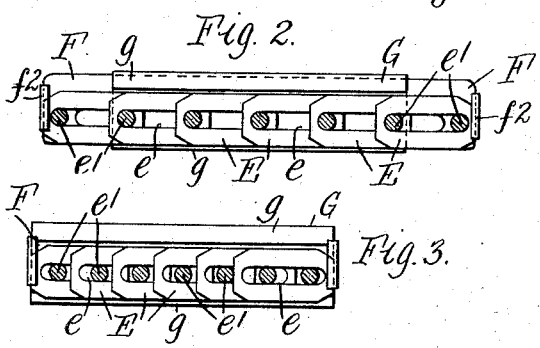
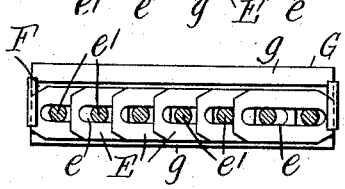
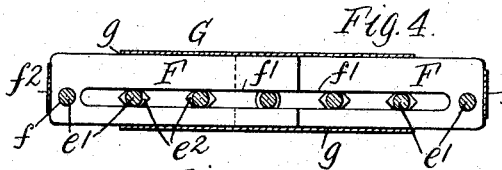
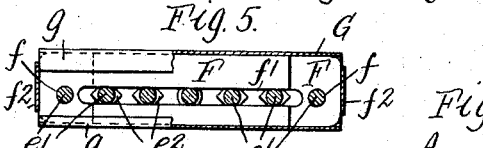
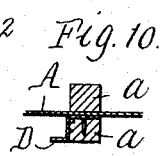
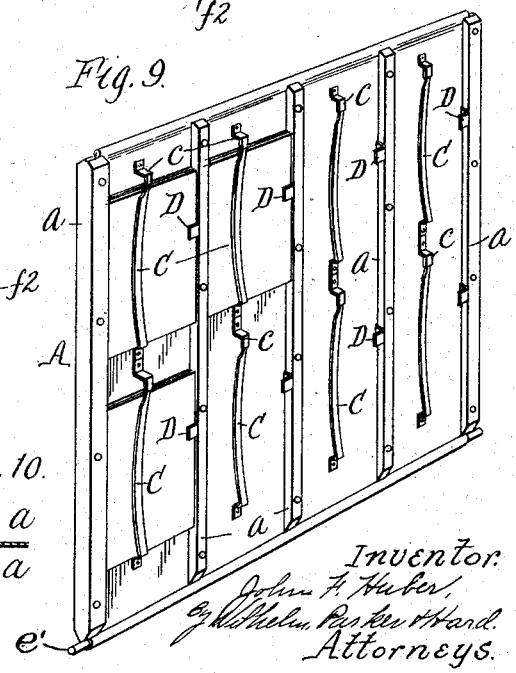
Witnesses.
A. G. Dimond.
C. H. Bund.
Inventor.
John F. Huber,
By Wilhelm, Parker & Hard.
Attorneys.

UNITED STATES PATENT OFFICE.

JOHN F. HUBER, OF BUFFALO, NEW YORK, ASSIGNOR TO CONRAD W. ZIMMER, OF BUFFALO, NEW YORK.

ACCOUNT-FILE.

1,015,444.

Specification of Letters Patent.

Patented Jan. 23, 1912.

Application filed May 7, 1910. Serial No. 559,896.

*To all whom it may concern:*

Be it known that I, JOHN F. HUBER, a citizen of the United States, residing at Buffalo, in the county of Erie and State of New York, have invented a new and useful Improvement in Account-Files, of which the following is a specification.

This invention relates to improvements in that type of account files for holding sales slips, accounts, or other papers which are provided with a series of leaves or plates which are equipped with suitable clips or holders for releasably retaining the papers in place on the leaves and are hinged together at one end in the form of a book so that the leaves can be turned for examining the slips or other papers on the opposite faces thereof.

One object of this invention is to provide a desirable connection for the leaves of simple and economical construction which permits the inner or connected ends of the leaves to be spread apart when the leaves are placed in the cabinet or holder therefor so that the leaves can swing freely on the connection without contact or interference with each other, and which allows the leaves, when not in use, to be collapsed into compact form suitable for being stored or transported.

Another object of the invention is to provide the leaves with suitable retaining devices which will assist the regular holding clips in retaining the sales slips in place on the leaves and will prevent the sales slips from shifting position and slipping out of place thereon when the regular holding clip is released for the insertion of additional slips.

In the accompanying drawings: Figure 1 is a sectional elevation of an account file embodying the invention. Fig. 2 is a sectional elevation, on an enlarged scale, of the connection at one edge of the leaves showing the same spread or expanded. Fig. 3 is a similar view of the connection when collapsed. Fig. 4 is a sectional elevation of the alining plates for the connection, showing the same spread or expanded. Fig. 5 is a similar view of the alining plates when collapsed. Fig. 6 is a fragmentary sectional elevation, on an enlarged scale, in line 6—6, Fig. 7. Fig. 7 is a fragmentary plan view, partly in section, of the file when spread or extended. Fig. 8 is a fragmentary side elevation of the file collapsed. Fig. 9 is a perspective view of one of the leaves. Fig. 10 is a cross section through the leaf and one of the retaining fingers.

Like reference characters refer to like parts in the several figures.

The account file consists of a series of leaves A which are hinged together to form a book and are normally held, when in use, in a holder or box B in which they stand in an upright position but can swing to a horizontal position to give access to the rear sides thereof. These leaves may be of any usual or suitable construction but they preferably consist of thin metal sheets with beaded upper and lower edges and have narrow parallel wooden strips $a$ secured on the inner face of the outer or cover leaves and on the opposite faces of the inner or intermediate leaves. These strips hold the leaves stiff and prevent the slips or papers in one row from contacting with those in an adjacent row.

The holder or box B may be of any suitable construction, that shown having a horizontal base portion $b$ and an upright portion $b'$ open at the top and front in which the leaves stand on an inclined board or support $b^2$ to which the inner edge of the uppermost of the leaves is detachably secured by hooks $b^3$ which project from the upper side of the support $b^2$.

Each leaf A is provided with a plurality of suitable holding clips C for holding the papers on the leaves. In the construction shown, these clips are formed from strips of spring metal, and are secured at one end to the leaf and at the other end detachably engage a catch $c$ on the face of the leaf. The papers are inserted by releasing the clip from the catch and swinging the same outwardly away from the leaf. When the leaves stand in a vertical position, it has been found that in releasing the spring clips on the front side of the leaf for the purpose of inserting additional sales slips or other papers beneath the same, there is a tendency for the sales slips which are already in place beneath the clips to shift their position and slide out from under the clips. To prevent this the spring clips C are arranged on the leaves so as to engage the sales slips at one side of the center thereof, and on the opposite side at the edge of the slips holding devices or fingers D are provided which overlap the side edges of the slips and assist the spring clips in holding the slips in place on the leaves. When the spring clip is released, the holding finger D prevents the slips from moving outwardly and sliding down out of place.

The holding finger D may be of any suitable form and secured to the leaf in any desirable manner. In the construction shown, it consists of a thin metal strip bent to substantially Z-shape, having oppositely extending flanges at its opposite ends, one flange being secured between the spacing strip a and the face of the leaf and the other flange projecting laterally from the upper edge of the spacing strip over the adjacent edges of the sales slips. The sales slips are inserted beneath the spring clip from the side on which the holding device is located and the latter holds the edges of the slips already in position against the face of the leaf when the spring clip is released and opened to receive additional slips.

The leaves are connected or hinged together at their lower or inner edges by a series of slotted connecting links E, each link serving to loosely connect two adjacent leaves together so that the leaves are free to turn on the links and can be spread apart so as to turn without interfering with one another, and can be collapsed when not in use. In the construction shown, the links are arranged on edge at the opposite side edges of the leaves, and each is provided with a longitudinal slot $e$. Each leaf has a rod or wire $e'$ which forms the core of the bead at the lower or inner edge of the leaf and projects from the opposite side edges thereof, the projecting ends extending through the slots $e$ in the links and forming pivots for the leaves. Nuts $e^2$ on the ends of the rods serve to hold the links thereon. The rods slidably connect the links together in series and each link connects the ends of the rods of two adjacent leaves. The slots $e$ are of suitable size to permit the rods to turn freely therein and to allow a certain amount of movement of the rods toward and from each other lengthwise of the links so that the leaves to which the rods are secured may be spread apart or collapsed as desired. Each link has a sliding connection with the adjoining links and the ends of the connecting links of the various leaves overlap in the same direction so that when the leaves are collapsed, the ends of the links may not come into contact with each other and thus interfere with the collapsing of the leaves. To hold the leaves of the file in alinement and prevent outward movement thereof relative to each other, they are provided at each of their side edges with sliding plates F which engage the projecting ends of the rods $e'$ and hold them in alinement but do not interfere with their movement toward and from each other. In the construction shown, the plates F are preferably arranged outside of the links E and within the nuts $e^2$ and are secured at their outer ends to the outer or cover leaves of the file, having holes $f$ through which the projecting ends of the rods $e'$ of these leaves extend. The plates extend toward each other with their inner ends overlapping and are provided with open-ended lengthwise slots $f'$ which are in register with each other and through which the projecting ends of the rods of the intermediate leaves extend. The plates at their opposite outer ends have inturned flanges $f^2$ which are adapted to engage the outer ends of the links E of the outside leaves and move these links inwardly when the leaves are collapsed and thus prevent these links from projecting beyond the ends of the guide plates. The plates F overlap each other at their inner ends and are secured together so as to slide freely upon each other in an endwise direction, but be held from other movement relative to each other. Any suitable means may be employed for this purpose. In the construction shown, a casing G is provided which embraces the opposite side edges of the plates F and has grooves or guides $g$ formed therein in which these edges slidably engage. The casing G is equal in length to the thickness of the file when collapsed and has a raised or offset central portion $g'$ which acts as a cover for the nuts $e^2$ on the ends of the rods $e'$ when the file is collapsed and protects them from injury and gives a neat appearance to the connections for the leaves. To hold the casing from endwise movement, it is preferably provided with a depressed central portion having an opening $g^2$ therein, and the rod $e'$ of the central leaf is provided at its end with a screw $g^3$, the head of which projects into the opening $g^2$. To remove the casing it is only necessary to take out the screw $g^3$ and slide the casing endwise off from the ends of the guide plates F.

I claim as my invention:

1. The combination of a series of file leaves provided with means for retaining papers thereon, and links for securing said leaves together to which said leaves are pivoted and which are slidably connected together by the pivotal portions of said leaves, each link connecting two adjacent leaves whereby said leaves can swing relative to each other and also can be adjusted toward and from each other, substantially as set forth.

2. The combination of a series of file leaves provided with means for retaining papers thereon, each leaf having pivots projecting from the opposite edges thereof at one end of the leaf, and links for securing said leaves together which are slidably connected by said pivots and each of which connects the pivots of two adjacent leaves whereby said leaves can swing relative to each other and can also be adjusted toward and from each other, substantially as set forth.

3. The combination of a series of file leaves provided with means for retaining papers thereon, links for securing said leaves together to which said leaves are pivoted and which are slidably connected by the pivotal portions of said leaves, each of said links connecting two adjacent leaves whereby said leaves can swing relative to each other and also can be adjusted toward and from each other, and means for holding said leaves in alinement, substantially as set forth.

4. The combination of a series of file leaves provided with means for retaining papers thereon, each leaf having pivots projecting from the opposite edges thereof at one end of the leaf, links for securing said leaves together which are slidably connected by said pivots and each of which connects the pivots of two adjacent leaves whereby said leaves can swing relative to each other and can also be adjusted toward and from each other, and plates which are adapted to slide relative to each other and which embrace said pivots for holding said leaves in alinement, substantially as set forth.

5. The combination of a series of file leaves provided with means for retaining papers thereon, each leaf having pivots projecting from the opposite edges thereof at one end of the leaf, links for securing said leaves together which are slidably connected by said pivots and each of which connects the pivots of two adjacent leaves whereby said leaves can swing relative to each other and can also be adjusted toward and from each other, and plates which are connected to the outermost leaves and are adapted to slide relative to each other and embrace said pivots for holding said leaves in alinement, substantially as set forth.

6. The combination of a series of file leaves provided with means for retaining papers thereon, each leaf having pivots projecting from the opposite edges thereof at one end of the leaf, links for securing said leaves together which are slidably connected by said pivots and each of which connects the pivots of two adjacent leaves whereby said leaves can swing relative to each other and can also be adjusted toward and from each other, and plates which are adapted to slide relatively to each other and which embrace said pivots for holding said leaves in alinement, said plates having portions at their outer ends which engage the end links and shove said links inwardly when said leaves are collapsed, substantially as set forth.

7. The combination of a series of file leaves provided with means for retaining papers thereon, each leaf having pivots projecting from the opposite edges thereof at one end of the leaf, links for securing said leaves together which are slidably connected by said pivots and each of which connects the pivots of two adjacent leaves whereby said leaves can swing relative to each other and can also be adjusted toward and from each other, plates which are adapted to slide relative to each other and which embrace said pivots for holding said leaves in alinement, a casing for inclosing the ends of said pivots, and means for holding said casing from endwise movement, substantially as set forth.

8. The combination of a series of file leaves provided with means for retaining papers thereon, and a series of overlapping links for securing said leaves together to which said leaves are pivoted, said links being slidably connected together and each link forming a sliding connection between two adjacent leaves whereby said leaves can swing relative to each other and also can be adjusted toward and from each other, substantially as set forth.

Witness my hand, this 6th day of May, 1910.

JOHN F. HUBER.

Witnesses:
E. C. HARD,
C. B. HORNBECK.